United States Patent [19]

Gordon

[11] 4,308,888
[45] Jan. 5, 1982

[54] PRESSURE REGULATOR

[76] Inventor: Carroll G. Gordon, 3 William Ct., Menlo Park, Calif. 94025

[21] Appl. No.: 130,698

[22] Filed: Mar. 17, 1980

[51] Int. Cl.³ ............................................. G05D 16/08
[52] U.S. Cl. ............................. 137/116.3; 137/625.66
[58] Field of Search ................... 137/85, 116.3, 625.66, 137/505.13

[56] References Cited

U.S. PATENT DOCUMENTS

| | | | |
|---|---|---|---|
| 3,225,619 | 12/1965 | Schaefer | 137/116.3 X |
| 3,416,554 | 12/1968 | Liang | 137/116.3 |
| 3,766,934 | 10/1973 | Fuchs | 137/116.3 |
| 3,774,629 | 11/1973 | Enomoto | 137/116.3 |
| 4,114,650 | 9/1978 | Gordon | 137/625.66 |

OTHER PUBLICATIONS

*Hydraulic and Pneumatic Power and Control*, Franklin D. Yeaple, McGraw-Hill Book Co., 1966, pp. 177-183.

*Primary Examiner*—Robert G. Nilson
*Attorney, Agent, or Firm*—Edward D. O'Brian

[57] ABSTRACT

An adjustable pressure regulator for use with pneumatic or hydraulic fluids can be constructed so as to utilize a spool valve structure capable of being operated so as to prevent flow between first, second and third passages or so as to permit the flow from the first passage to the second while blocking flow to or from the third passage and so as to permit flow from the second passage to the third passage while preventing flow to or from the first passage and first and second position control means located adjacent to the valve structure. The first control means includes a bellows having its interior in communication with the first passage. The second control means also includes a second bellows having its interior in communication with the second passage. The movable ends of these bellows are operatively associated with the valve spool so that the operation of the valve structure is determined by the differential in the forces applied to the valve structure by the movable ends of the bellows.

7 Claims, 4 Drawing Figures

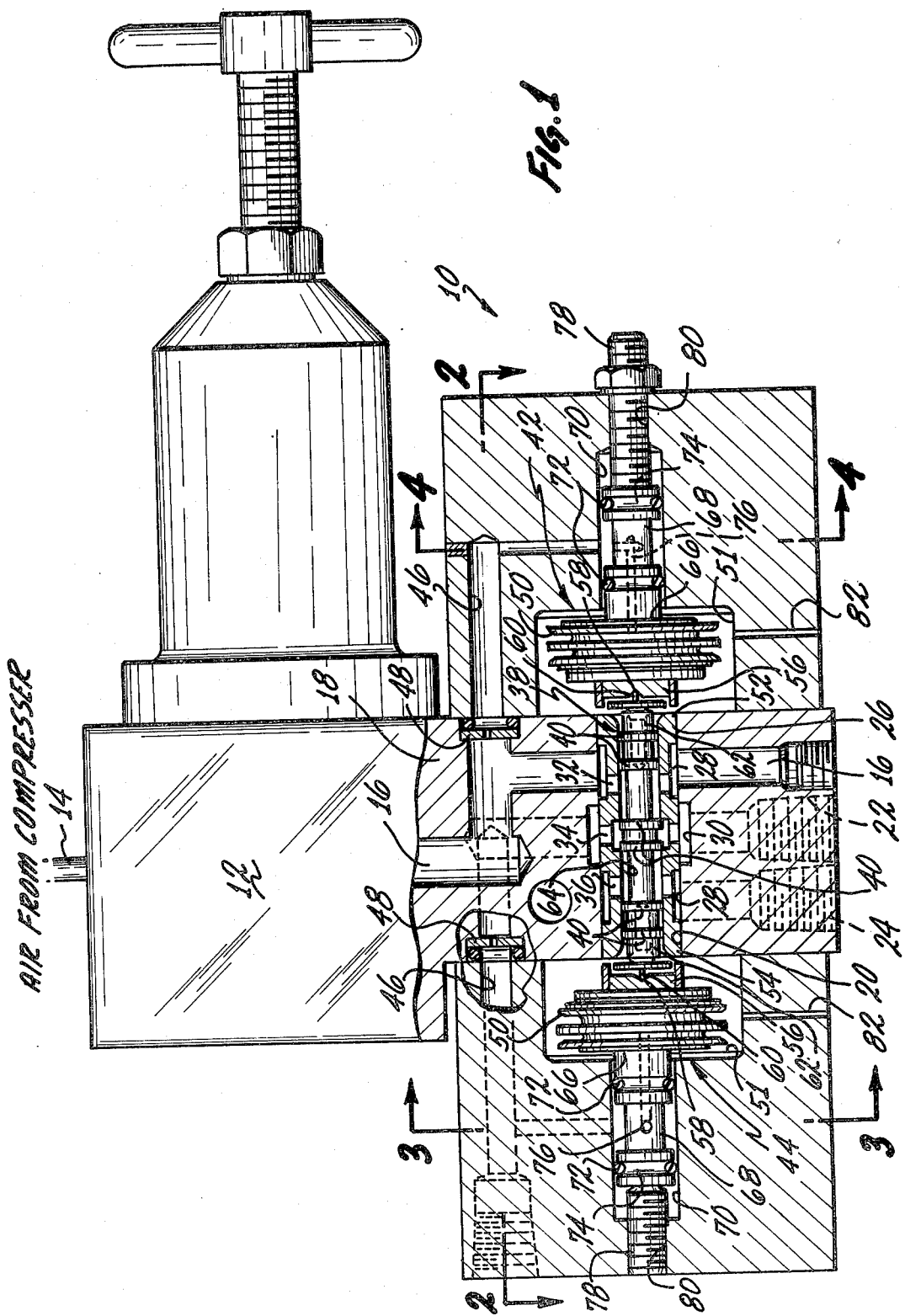

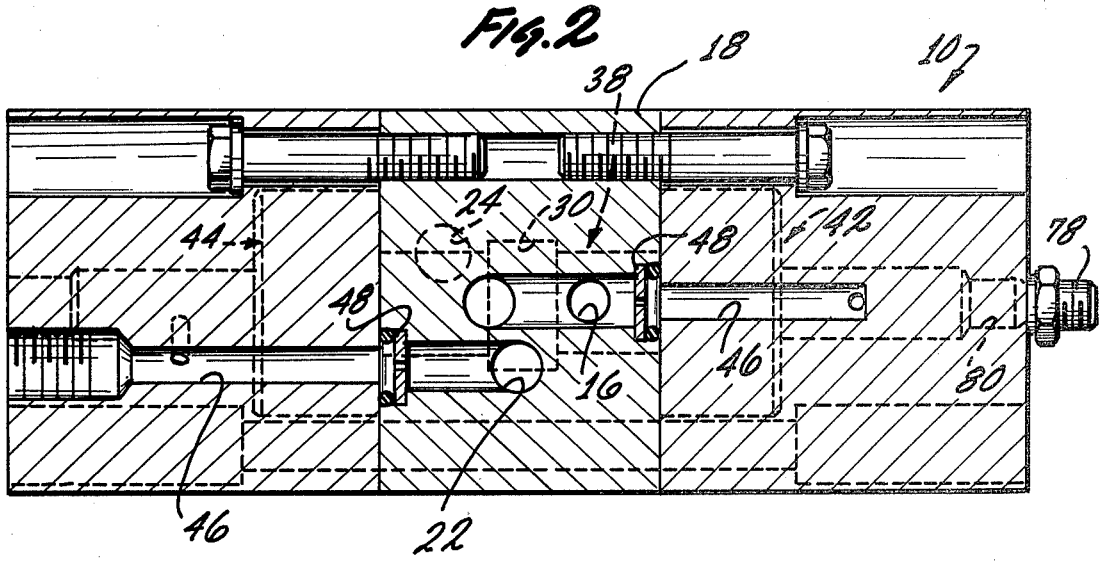
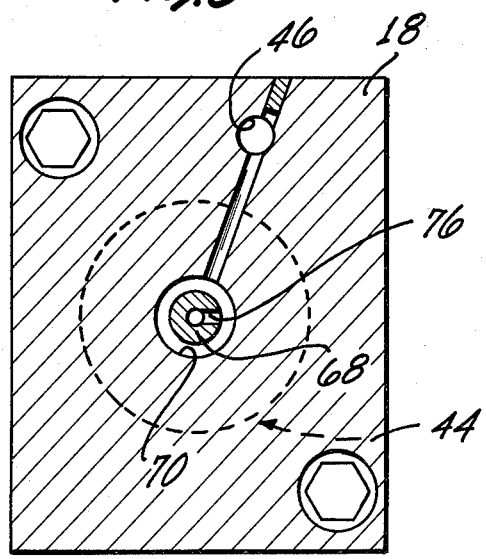
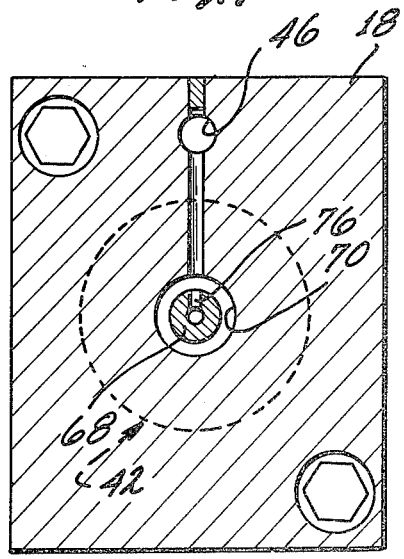

PRESSURE REGULATOR

BACKGROUND OF THE INVENTION

The invention set forth in this specification pertains to a new and improved pressure regulator for use with pneumatic or hydraulic fluids.

Although various types of fluid pressure regulators have, of course, been known and used for many years in controlling the pressure of a fluid from a supply line or port to a pressure line or port so that the pressure within the pressure line or port remains relatively constant, it is considered that there is a need for new and improved pressure regulators. It is considered there is this need because various known pressure regulators are for one reason or another considered to be unsatisfactory in maintaining a constant or relatively constant load pressure in the load line or port when the pressure in the load line becomes greater than the load pressure maintained by the regulator.

In certain applications it is necessary to control the pressure in the load line so that it is relatively constant even if the operation of a device connected to the load line should cause an increase in the pressure in the load line above the pressure of the fluid supplied to the regulator. It is not considered that an understanding of this invention requires a detailed analysis of various prior different regulators and an indication of the reasons why such prior different regulators are considered to be unsatisfactory in controlling the pressure in the load line even when there is an increase in such pressure in the load line causing it to be greater than the pressure of the fluid normally supplied by the regulator to the load line. These reasons are considered to be somewhat diverse in character.

BRIEF SUMMARY OF THE INVENTION

A broad objective of the present invention is to provide new and improved pressure regulators which operate so as to maintain the pressure in a load line substantially constant even if the pressure in the load line becomes greater than the pressure of the fluid supplied to the regulator. Other objects of the present invention are: to provide pressure regulators for the purpose indicated: which may be easily and conveniently manufactured; which are capable of giving prolonged reliable performance; and which may be easily serviced.

In accordance with this invention these various objectives are achieved by providing a fluid pressure regulator having a valve structure including a valve body having first, second and third valve ports, a first passage leading to said first port, a second passage leading to said second port, and a third passage leading to said third port and including a valve member located with respect to said valve body so as to be capable of being reciprocated with respect to said valve port so as to be located so as to prevent flow between said ports or so as to control flow from said first port to said second port while preventing flow from said second port to said third port or so as to control flow from said second port to or from said third port while preventing flow from said first port to said second port in which the improvement comprises: a first position control means for applying a force to said valve member so as to tend to move said valve member in one direction in accordance with the fluid pressure in said first passage so as to permit flow between said first and second ports while preventing flow from said second port to said third port; a second position control means for applying a force to said valve member so as to tend to move said valve member in the opposite direction in accordance with the fluid pressure in said second passage so as to permit flow between said second and third ports while preventing flow from said first port to said second port; the position of said valve member with respect to said ports at any one time being determined by the differential in the forces applied to said valve member by said first and said second position control means.

BRIEF DESCRIPTION OF THE DRAWINGS

Because of the nature of this invention it is best more fully described with reference to the accompanying drawings in which:

FIG. 1 is a side elevational view, partially in section, of a presently preferred embodiment of an adjustable pressure regulator in accordance with this invention in which the principal portions of the regulator are shown in section;

FIG. 2 is a cross-sectional view taken at line 2—2 of FIG. 1;

FIG. 3 is a cross-sectional view taken at line 3—3 of FIG. 1; and

FIG. 4 is a cross-sectional view taken at line 4—4 of FIG. 1.

It will be realized from a consideration of the drawing and of the remainder of this specification that the particular regulator illustrated employs certain operative concepts or principles as set forth in the claims appended to this specification. Those skilled in the art of designing and constructing pressure regulators will realize that these concepts and/or principles can be employed in a wide variety of regulators which are constructed differently than the precise valve illustrated in the drawing.

DETAILED DESCRIPTION

In the drawing there is illustrated an adjustable pressure regulator 10 in accordance with this invention. This regulator 10 is preferably, but not necessarily, utilized in connection with a known type of adjustable pressure regulator 12 utilized to supply a pneumatic or hydraulic fluid from a supply line 14 to a first or supply passage 16 in a valve body 18. The regulator 12 may be built into this valve body 18 as shown or may be incorporated with a pump used to supply fluid.

Within the valve body 18 there is located an elongated cylindrical bore 20 which is intersected by the passage 16. It is also intersected by a second or load passage 22 and a third or exhaust passage 24. These passages 16, 22 and 24 are located along the length of the bore 20 so as to be spaced from one another. Within the bore 20 there is located an elongated sleeve 26 which fits closely within the bore 20. This sleeve 26 has peripheral grooves 28 immediately adjacent to the passages 16 and 24. Although a similar groove 30 could be located adjacent to the second passage 22 in the sleeve 26 in the precise structure shown it is located in the valve body 18 in communication with the second passage 22. First, second and third ports 32, 34 and 36 are located in the sleeve 26 in communication with the first, second and third passages 16, 22 and 24, respectively.

A valve spool 38 is located within the bore 20 so as to be capable of being reciprocated within this bore 20. This spool 38 has the usual flanges 40 which closely engage the interior of the bore 20. These flanges 40 are located so that as the spool 38 is manipulated it may be located either in a position as shown in which there is no flow between any of the ports 32, 34 and 36, and so that the spool 38 may be moved to the left from the position indicated in FIG. 1 to various extents in order to regulate flow from the first port 32 to the second port 34 while blocking any flow to the third port 36 and so that the spool 38 may be moved to the right from the position indicated in FIG. 1 so as to permit flow from the second port 34 to the third port 36 while blocking any flow to or from the first port 32.

In the regulator 10 first and second position control means 42 and 44 are employed so as to regulate the position of the spool 38. Inasmuch as these control means 42 and 44 are constructed in an identical manner they are described concurrently herein and the various parts of these means 42 and 44 are indicated both in this specification and in the drawing by the same numerals. The sole difference between the position control means 42 and 44 lies in the fact that the first position control means 42 is connected to the first passage 16 by a duct or passage 46 while the second position control means 44 is connected to the second passage 22 by a similar duct or passage 46.

Each of the ducts 46 contains a conventional pressure reducing orifice plate 48 which is used primarily to achieve dynamic pressure stability as there is fluid flow as hereinafter described to and from bellows 50. These bellows 50 are located in cavities 51 in the body 18. The bellows 50 are constructed so as to be generally in axial alignment with the bore 20 and are located so that the bellows 50 of the first position control means 42 is adjacent to one end 52 of the bore 20 and so that the bellows 50 of the second position control means 44 is adjacent to the other end 54 of the bore 20. These bellows 50 have movable ends 56 adjacent to the ends 52 and 54 which are provided with centrally located conical depressions 58. These depressions 58 are engaged by pointed extremities 60 of "pushers" 62 fitting within cavities 64 in the spool 38.

The bellows 50 have fixed ends 66 mounted upon sleeves 68 which are slidably mounted within other bores 70 located in alignment with the bore 20. These sleeves 68 are preferably sealed relative to the interiors of the bores 70 through the use of conventional O-ring seals 72. Grooves 74 are located around the sleeves 68 so as to place the ducts 46 in communication with the interiors (not separately numbered) of the bellows 50 through the use of holes 76 in the sleeves 68.

The positions of these sleeves 68 may be regulated by exerting pressure on them through the use of threaded shafts 78 mounted within threaded holes 80 in the valve body 18. Although it would be possible to connect the shafts 78 to the adjacent sleeves 68 utilizing conventional rotary connections (not shown) so that the shafts 78 could be manipulated to withdraw the sleeves 68 generally away from the bore 20, this is not considered necessary with the present invention. It is noted that the exteriors (not separately numbered) of the bellows 50 are normally subjected to atmospheric pressure through the use of small vent passages 82 extending through the valve body 18 into the cavities 51 in the valve body 18.

The utilization of the regulator 10 is essentially very simple. The pressure of a pneumatic or hydraulic fluid supplied through the line 14 is regulated so as to have a substantially constant supply pressure as it is introduced into the passage 16. As the regulator 10 is initially used, some fluid within this passage 16 will move through the duct 46 at a reduced pressure because of the orifice plate 48 so as to tend to expand the bellows 50 of the first position control 42. As this bellows 50 expands internally it will reach the supply pressure and it pushes the spool 38 so as to permit flow between the first and second ports 32 and 34 while closing off the third port 36.

As a result of this movement of the spool 38 the fluid under pressure within the passage 16 will be supplied to the second or load passage 22. As the pressure within the second or load passage 22 increases, the pressure within the duct 46 of the second position control 44 will increase. As this occurs the bellows 50 in the second position control 44 will expand so as to tend to move the movable end 56 of this bellows 50 in order to move the spool 38 generally toward the first position control 42. Such movement will of course result in movement of the valve spool 38 in accordance with the differential in the forces applied to the valve spool 38 by the two bellows 50. As the load pressure in the second passage 22 builds up, a point will be reached where the spool 38 will be moved so that there is no flow between any of the ports 32, 34 and 36. If, after this point has been reached, the pressure in the second passage 22 should increase as a result of the operation of one or more components (not shown) connected to the second passage 22 there will be an increase in pressure in the second position control 44 which will result in a force greater than the force exerted by the first position control 42. As a consequence of such a differential in forces applied to the spool 38 this spool 38 will move so as to permit flow from the second port 34 to the third port 36 until such time as the load pressure is reduced so as to correspond to the pressure in the first passage 16. Then the differential in forces exerted by the two position controls 42 and 44 will be equalized so as to move the spool 38 so there is no further flow between the ports 32, 34 and 36.

From a consideration of the preceding it will be realized that a number of variations may be made in the precise regulator 10 described. As an example of this it is possible to substitute for the bellows 50 shown and described low friction pistons and centering springs. It is preferred, however, to utilize the bellows 50 indicated because they provide low friction motion and in addition provide spring gradients necessary for the satisfactory operation of the regulator 10. In the regulator 10 the various parts are constructed so as to relate the pressure in the supply passage 16 to the static load conditions and to pressures which will develop in the load pressure during use.

If desired, the pressure relationships can be varied somewhat by conventional expedients or methods for obtaining essentially equal forces from fluids at different pressures. With the regulator 10 differently sized bellows 50 can be utilized as desired so as to obtain the sensitivity required for use under different operating conditions. If increased sensitivity is required, larger sized bellows 50 should be used to reduce relative hysteresis losses. Different sized orifice plates 48 may be employed with the regulator 10 as necessary to maintain system stability in any particular use of this regulator 10.

I claim:

1. A fluid pressure regulator having a valve structure including a valve body having first, second and third valve ports, a first passage leading to said first port, a second passage leading to said second port, and a third passage leading to said third port and including a valve member located with respect to said valve body so as to be capable of being reciprocated with respect to said valve ports so as to be located so as to prevent flow between said ports or so as to control flow from said first port to said second port while preventing flow from said second port to said third port or so as to control flow from said second port to or from said third port while preventing flow from said first port to said second port, in which the improvement comprises:

a first position control means for applying a force to said valve member so as to tend to move said valve member in one direction in accordance with the fluid pressure in said first passage so as to permit flow between said first and second ports while preventing flow from said second port to said third port, said first position control means comprising a movable member which is movable during the operation of said regulator in response to pressure in said first passage, a second position control means for applying a force to said valve member so as to tend to move said valve member in the opposite direction in accordance with the fluid pressure in said second passage so as to permit flow between said second and third ports while preventing flow from said first port to said second port, said second position control means comprising a movable member which is movable during the operation of said regulator in response to the pressure in said second passage, the position of said valve member with respect to said ports at any one time being determined by the differential in the forces applied to said valve member by said first and second position control means, said movable members of said position control means being operatively associated with said valve member so that the position of said valve member at any one time is determined by the positions of said movable members, said movable members being separate and apart from said valve member and being located generally between different parts of said valve body and said valve member so as to bear against different portions of said valve member, said valve member being capable of being moved only in response to force applied to it by said movable members.

2. A fluid pressure regulator having a valve structure including a valve body having first, second and third valve ports, a first passage leading to said first port, a second passage leading to said second port, and a third passage leading to said third port and including a valve member located with respect to said valve body so as to be capable of being reciprocated with respect to said valve ports so as to be located so as to prevent flow between said ports or so as to control flow from said first port to said second port while preventing flow from said second port to said third port or so as to control flow from said second port to or from said third port while preventing flow from said first port to said second port, in which the improvement comprises:

a first position control means for applying a force to said valve member so as to tend to move said valve member in one direction in accordance with the fluid pressure in said first passage so as to permit flow between said first and second ports while preventing flow from said second port to said third port, a second position control means for applying a force to said valve member so as to tend to move said valve member in the opposite direction in accordance with the fluid pressure in said second passage so as to permit flow between said second and third ports while preventing flow from said first port to said second port, the position of said valve member with respect to said ports at any one time being determined by the differential in the forces applied to said valve member by said first and said second position control means, said first position control means comprising a bellows having an interior, a fixed end and a movable ends, the interior of said bellows being in fluid communication with said first passage, the movable end of said first bellows being located so that movement of said movable end of it is transmitted to said valve member, said second position control means comprising a bellows having an interior, a fixed end and a movable end, the interior of said bellows being in fluid communication with said second passage, the movable end of said second bellows being located so that movement of said movable end of it is transmitted to said valve member.

3. A fluid pressure regulator as claimed in claim 2 wherein:

at least one of said position control means includes means for adjusting the position of the fixed end of the bellows of such position control means.

4. A fluid pressure regulator as claimed in claims 2 or 3 wherein:

said first position control means also includes pressure reducing means for controlling flow into said bellows so as to achieve dynamic stability, said second position control means also includes pressure reducing means for controlling flow into said bellows so as to achieve dynamic stability.

5. A fluid pressure regulator having a valve structure including a valve body having first, second and third valve ports, a first passage leading to said first port, a second passage leading to said second port, and a third passage leading to said third port and including a valve member located with respect to said valve body so as to be capable of being reciprocated with respect to said valve ports so as to be located so as to prevent flow between said ports or so as to control flow from said first port to said second port while preventing flow from said second port to said third port or so as to control flow from said second port to or from said third port while preventing flow from said first port to said second port, in which the improvement comprises:

a first position control means for applying a force to said valve member so as to tend to move said valve member in one direction in accordance with the fluid pressure in said first passage so as to permit flow between said first and second ports while preventing flow from said second port to said third port, a second position control means for applying a force to said valve member so as to tend to move said valve member in the opposite direction in accordance with the fluid pressure in said second passage so as to permit flow between said second and third ports while preventing flow from said first port to said second port, the position of said valve member with respect to said ports at any one time being determined by the differential in the forces applied to said valve member by said first and said second position control means, said valve ports are located within a cylindrical bore within said valve body so as to be linearly spaced from one another along the length of said bore, said valve member is a valve spool having a plurality of flanges located along its length, said flanges fitting closely against the interior of said valve bore so as to control flow between said ports, said valve spool being linearly movable within said bore, said valve body includes a first cavity adjacent to one end of said bore within said valve body and a second cavity adjacent to the other end of said bore within said valve body, said first position control means is located within said first cavity and said second position control means is located within said second cavity, said first position control means comprises a first bellows having an interior, a fixed end mounted on said valve body and a movable end located adjacent to one end of said bore, said first bellows being axially aligned with said bore so as to permit movement of said movable end toward and away from said bore, said first position control means also including a first communication duct placing the interior of said first bellows in fluid communication with said first passage, said second position control means comprising a second bellows having an interior, a fixed end mounted on said valve body and a movable end located adjacent to the other end of said bore, said second bellows being axially aligned with said bore so as to permit movement of said movable end toward and away from said bore, said second position control means also including a second bellows in fluid communication with said second passage, said movable ends of said bellows being operatively associated with the ends of said valve body so that movement of said movable ends of said bellows are transmitted to said valve spool in order to move said valve spool.

6. A fluid pressure regulator as claimed in claim 5 wherein:

said first position control means also includes a pressure reducing orifice located within said first communication duct for controlling flow so as to achieve dynamic stability, said second position control means also includes a pressure reducing orifice located within said second communication duct for controlling flow so as to achieve dynamic stability.

7. A fluid pressure regulator as claimed in claims 5 or 6 wherein:

each of said position control means includes means for adjusting the position of said fixed end of said bellows associated with control means with respect to said bore.

* * * * *